(12) United States Patent
Pruitt et al.

(10) Patent No.: US 7,681,322 B1
(45) Date of Patent: Mar. 23, 2010

(54) STEERING WHEEL LEVEL VERIFICATION WITH ALIGNMENT SENSORS ATTACHED

(75) Inventors: Carl W. Pruitt, Conway, AR (US); George M. Gill, Vilonia, AR (US)

(73) Assignee: Snap-On Incorporated, Kenosha, WI (US)

( * ) Notice: Subject to any disclaimer, the term of this patent is extended or adjusted under 35 U.S.C. 154(b) by 378 days.

(21) Appl. No.: 11/654,498

(22) Filed: Jan. 18, 2007

(51) Int. Cl.
*G01B 7/30* (2006.01)
*G01B 11/26* (2006.01)

(52) U.S. Cl. .................................. 33/203.18

(58) Field of Classification Search ............ 33/203, 33/203.18, 203.19, 203.2, 288
See application file for complete search history.

(56) References Cited

U.S. PATENT DOCUMENTS

| | | | | |
|---|---|---|---|---|
| 5,291,964 A * | 3/1994 | Groenenboom | ............. | 180/422 |
| 5,553,389 A * | 9/1996 | Winslow et al. | .......... | 33/203.18 |
| 5,760,938 A * | 6/1998 | Hodge | ........................ | 33/288 |
| 5,943,783 A * | 8/1999 | Jackson | ....................... | 33/288 |
| 6,148,528 A * | 11/2000 | Jackson | ....................... | 33/288 |
| 6,560,516 B1 * | 5/2003 | Baird et al. | ................... | 701/23 |
| 6,728,609 B2 * | 4/2004 | Murray et al. | ................ | 701/29 |
| 7,089,150 B2 * | 8/2006 | Phillips, III | ................. | 702/154 |
| 7,100,289 B1 * | 9/2006 | Strege et al. | .................. | 33/203 |
| 7,181,852 B2 * | 2/2007 | Bryan | ..................... | 33/203.18 |
| 7,265,821 B1 * | 9/2007 | Lawrence et al. | ...... | 356/139.09 |
| 7,313,869 B1 * | 1/2008 | Rogers | .................... | 33/203.18 |
| 7,328,124 B2 * | 2/2008 | Voeller | ....................... | 702/151 |
| 7,334,805 B2 * | 2/2008 | Nam | ..................... | 280/86.753 |
| 7,369,222 B2 * | 5/2008 | Jackson et al. | ......... | 356/139.09 |
| 2004/0054451 A1 * | 3/2004 | Murray et al. | ................ | 701/29 |
| 2004/0194327 A1 * | 10/2004 | Bryan | ..................... | 33/203.18 |
| 2005/0126021 A1 * | 6/2005 | Robb et al. | ................... | 33/288 |
| 2005/0234615 A1 * | 10/2005 | Rigsby et al. | ................. | 701/29 |
| 2006/0080015 A1 * | 4/2006 | Voeller | ....................... | 701/41 |
| 2006/0138740 A1 * | 6/2006 | Nam | ..................... | 280/86.756 |
| 2006/0274303 A1 * | 12/2006 | Jackson et al. | ........... | 33/203.18 |
| 2006/0283027 A1 * | 12/2006 | Bryan | ..................... | 33/203.18 |
| 2007/0095122 A1 * | 5/2007 | Voeller | ....................... | 73/1.08 |
| 2008/0119978 A1 * | 5/2008 | Stieff et al. | ................... | 701/29 |
| 2009/0056152 A1 * | 3/2009 | Rogers | .................... | 33/203.18 |

* cited by examiner

*Primary Examiner*—Yaritza Guadalupe-McCall
(74) *Attorney, Agent, or Firm*—McDermott Will & Emery LLP (57) ABSTRACT

A vehicle wheel alignment system may include wheel alignment sensors configured to measure toe angles of steerable wheels on the vehicle, a user interface configured to communicate information to a user, and a processing system. The processing system may be configured to cause the user interface to communicate instructions to rotate a steering wheel on the vehicle and to communicate centering information that is pertinent to whether the steering wheel is substantially centered with respect to the steerable wheels based at least in part on the toe angles.

22 Claims, 9 Drawing Sheets

STEERING WHEEL LEVEL VERIFICATION WITH ALIGNMENT SENSORS ATTACHED

BACKGROUND

1. Technical Field

This disclosure relates to vehicle wheel alignment systems.

2. Description of Related Art

Wheels on a vehicle are often realigned. The vehicle is typically driven into an alignment bay, put onto an alignment lift, and attached to wheel alignment sensors.

On some cars, the camber and toe of the rear wheels may be aligned first, the rear thrust angle may be determined, the caster and camber of the front wheels may be aligned next, the steering wheel may be locked in its level position, and the toe of the front wheels may be aligned last. The alignment sensors are usually then detached from the vehicle and the vehicle is road tested. During the road test, the rotational position of the steering wheel is examined while the vehicle is traveling straight to verify that the steering wheel is level.

Sometimes, the steering wheel will not be level while the vehicle is traveling straight, even though the front toe was adjusted while the steering wheel was locked in its level position. The linkage between the steering wheel and the front wheels often has a small degree of hysteresis. This hysteresis may allow the front wheels to turn during the alignment process, even though the steering wheel has been locked in its level position.

This misalignment may require the vehicle to be returned to the alignment bay, the alignment sensors to be reattached, the vehicle to again be raised on the lift, and the front wheels to be realigned. This adds to the cost of the alignment and the time it takes to complete. This misalignment is also sometimes not detected by the technician, sometimes causing customer dissatisfaction.

SUMMARY

A vehicle wheel alignment system may include wheel alignment sensors configured to measure toe angles of steerable wheels on the vehicle, a user interface configured to communicate information to a user, and a processing system. The processing system may be configured to cause the user interface to communicate instructions to rotate a steering wheel on the vehicle and to communicate centering information that is pertinent to whether the steering wheel is substantially centered with respect to the steerable wheels based at least in part on the toe angles.

These, as well as other components, steps, features, objects, benefits, and advantages, will now become clear from a review of the following detailed description of illustrative embodiments, the accompanying drawings, and the claims.

The drawings disclose illustrative embodiments. They do not set forth all embodiments. Other embodiments may be used in addition or instead. Details that may be apparent or that are unnecessary are also often omitted to save space or for a more effective illustration. When the same numeral appears in different drawings, it is intended to refer to the same or like components or steps.

DETAILED DESCRIPTION OF ILLUSTRATIVE EMBODIMENTS

Illustrative embodiments are now discussed. Other embodiments may be used in addition or instead. Details that may be apparent or that are unnecessary are also often omitted to save space or for a more effective presentation.

Figure 1:
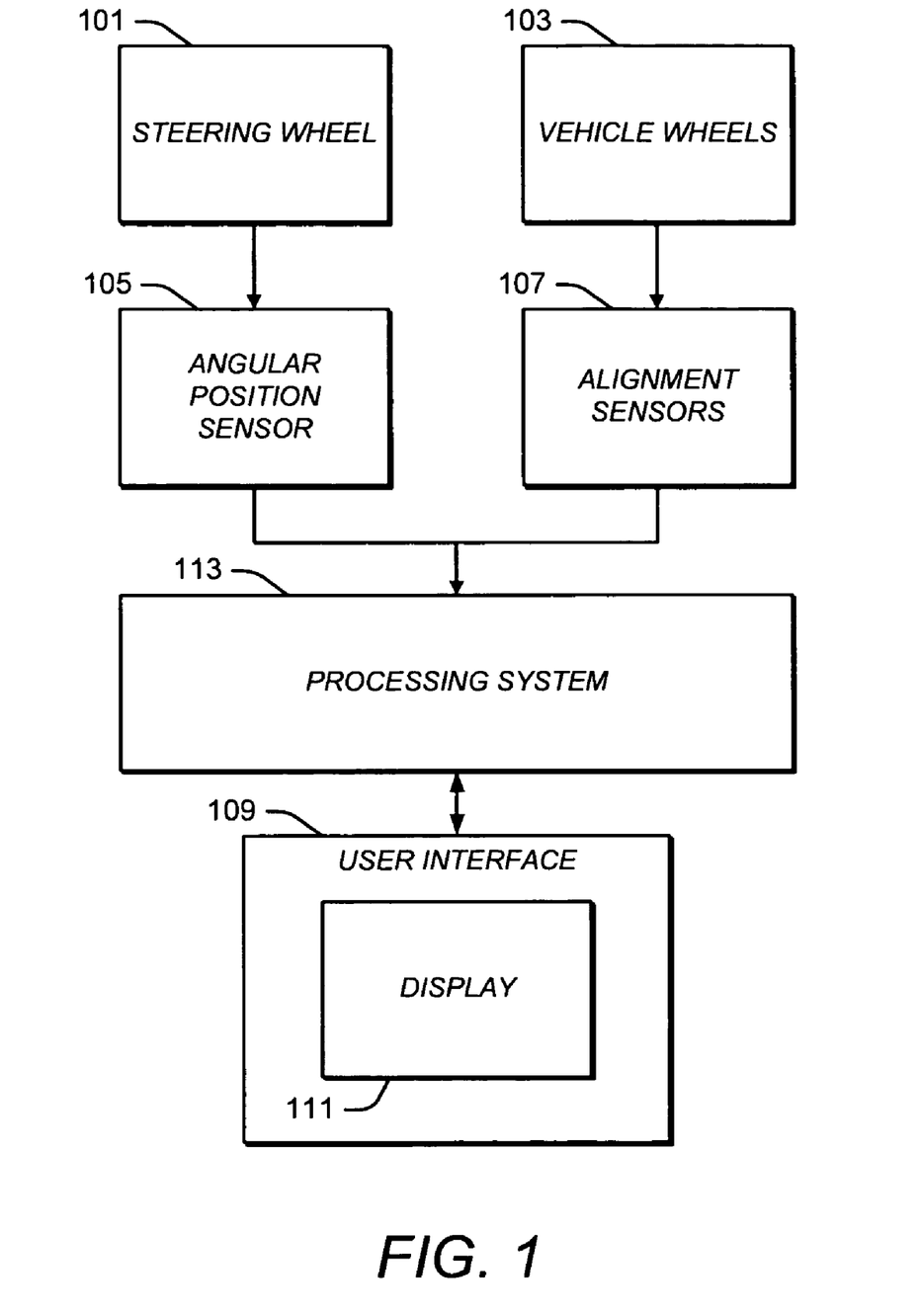
FIG. 1 is a block diagram of a vehicle wheel alignment system incorporating a steering wheel level verification system.

FIG. 1 is a block diagram of a vehicle wheel alignment system incorporating a steering wheel level verification system. As shown in FIG. 1, a vehicle may have a steering wheel 101 and wheels 103. The vehicle may be of any type. For example, the vehicle may be a motor vehicle, such as an automobile. The vehicle wheels 103 may be of any number and on any number of axles. For example, the vehicle wheels 103 may consist of two rear wheels and two steerable front wheels.

The steering wheel 101 may have a rotational position that is commonly referred to as "level" or "centered." This "level" or "centered" position may be signified by the symmetrical alignment of spokes that support the steering wheel with a vertical line traversing the center of the steering wheel. It may in addition or instead be signified by the horizontal alignment of a logo or other type of symbol in the center of the steering wheel. Other types of centering indicia may be present in addition or instead.

When the vehicle wheels and steering wheel are properly aligned, the steering wheel may be at its "centered" or "level" position when the vehicle is driven straight down the road.

The steering wheel 101 may be coupled to a rotational position sensor 105. The rotational position sensor 105 may be configured to generate information indicative of the rotational position of the steering wheel 101. The rotational position sensor 105 may be of any type, such as an encoder, an inclinometer, such as a MEMS device, or a potentiometer. The rotational position sensor 105 may be integrated into the vehicle when it is manufactured. The rotational position sensor 105 may instead be attached to the steering wheel 101 or to a component that is linked to it before or during the alignment process and removed when the alignment is complete.

One or more alignment sensors 107 may be attached to one or more of the vehicle wheels 103. For example, one alignment sensor may be attached to each of the vehicle wheels 103. Alternatively, one or more of the alignment sensors 107 may each be used to determine the alignment of two or more of the vehicle wheels 103.

The alignment sensors 107 may be of any type, including optical devices such as a CCD, an inclinometer, or mechanical devices. One or more of the alignment sensors 107 may be configured to measure the camber, caster, and/or toe of each of the vehicle wheels 103. There may be a different type of alignment sensor for each type of measurement, or one or more of the alignment sensors 107 may be used to make more than one type of measurement.

One or more of the alignment sensors 107 may be configured to measure the toe angle of one or more of the vehicle wheels 103, such as the toe angle of each of the front wheels and/or each of the rear wheels. The toe angle of a wheel may be with respect to the rear thrust angle of the vehicle or with respect to the center line of the vehicle. Unless otherwise indicated, "toe angle" is a reference to the individual toe angle of a wheel.

A user interface 109 may be configured to communicate information to and to receive information from a user, such as a vehicle service technician. The user interface 109 may include any type or types of output devices, such as one or more displays, lights, analog or digital meters, and/or sound systems.

One or more of these output devices may be configured to communicate information to a user about one or more toe angles. For example, a real or virtual meter pointer may visually illustrate one or more toe angles. An image of a tire or other object, a digital readout of one or more toe angles, lights, beeping patterns, variable tones, and/or a computer-controlled voice may be used in addition or instead.

One or more components of the output section of the user interface 109 may be used to instruct a user to rotate the steering wheel 101 in one or more directions at one or more times. For example, textual instructions to the user may be provided by a display 111. One or more lights, images, digital readouts, beeps, tones, and/or voices may be used in addition or instead.

The user interface 109 may also have one or more input devices, such as one or more touch screens, keyboards, mice, microphones, buttons, and/or switches. One or more of these may be configured to receive information from a user relating to the operation and/or maintenance of the alignment system and/or the vehicle.

The user interface 109 may include any other type of input or output device in addition or instead.

A processing system 113 may be configured to receive information from the rotational position sensor 105 about the rotational position of the steering wheel 101. The processing system 113 may be configured to receive information from the alignment sensors 107 about the alignment of the vehicle wheels 103, such as the toe angle of one or more of the vehicle wheels 103. The processing system 113 may be configured to receive information from the user interface 109, such as information provided to the user interface 109 by a user through one or more of its input devices.

The processing system 113 may be configured to communicate with the user interface 109 so as to cause the user interface 109 to communicate information to the user, such as information related to one or more toe angles, and such as instructions to the user to rotate the steering wheel 101 in one or more directions at one or more times. The processing system 113 may be configured to cause the user interface 109 to communicate to the user any of the types of information that are described below, and/or any other type of information. The processing system 113 may be configured to perform other functions that are not described in this application.

The processing system 113 may be configured to communicate with the rotational position sensor 105, the alignment sensors 107 and/or the user interface 109 through any means, such as through a wired connection, a wireless connection, and/or a combination of types of connections. The processing system 113 may be at the same location as the rotational position sensor 105, the alignment sensors 107, and/or the user interface 109, or may be located remotely from one or more of them. For example, the processing system 113 may be connected to the rotational position sensor 105, the alignment sensors 107, and/or the user interface 109 through the Internet and/or other type of network communication system.

The processing system 113 may be of any type. For example, it may include one or more general purpose or dedicated computers, each of which may have one or more storage devices, processors, working memories, and/or input/output interfaces. The processing system 113 may include appropriate software stored in a memory system, such as one or more operating systems and application programs, that assist the processing system 113 in performing the functions that have been described herein, as well as other functions that have not been described herein.

FIGS. 2(*a*)-(*d*) illustrate a process for testing the centering of a steering wheel using the wheel alignment system illustrated in FIG. 1. This process may be used in connection with a system other than the one illustrated in FIG. 1, and the system illustrated in FIG. 1 may be used in connection with a process other than the one illustrated in FIGS. 2(*a*)-(*d*).

As illustrated in FIGS. 2(*a*)-(*d*), a steering wheel 101 may be used in association with a vehicle 203 to steer the vehicle. The vehicle 203 may have a set of wheels, such as a set of front steerable wheels 205 and 207 and a set of rear wheels 209 and 211.

The display 111 of the vehicle wheel alignment system may include a message section 215 at which a message may be provided to a user, a real or virtual pointer 217 that may be indicative of toe angle measurements of one or both of the front wheels 205 and 207, a real or virtual scale 219 which may be indicative of different toe angles that may be measured by the system, and a real or virtual marker 221 that may be indicative of various predetermined toe angles or relationship between toe angles, such as when they are substantially equal, to which a user may be directed to steer the front wheels 205 and 207 using the steering wheel 101.

Numerous variations on what has thus-far described in connection with FIG. 2 may be used in addition or instead. For example, instead of an arrow, the marker 221 may be a small colored area on the scale 219, such as a small green area, while the remaining portions of the scale 219 may be in red. In lieu of the pointer 217, the scale 219, and the marker 221, a real or virtual digital readout may be provided. In lieu of or in addition to a message in the message section 215, beeps, variable tones, voices, and/or lights may be used.

Figure 2A:
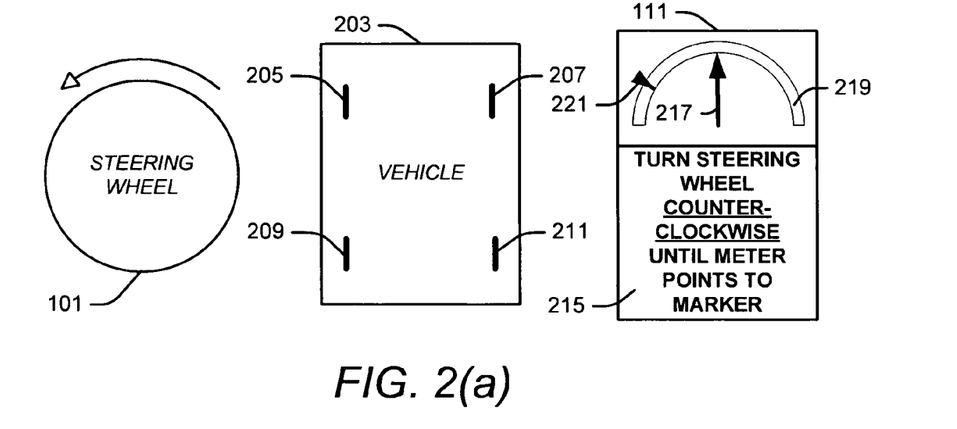
FIGS. 2(a)-(d) illustrate a process for testing the centering of a steering wheel using the wheel alignment system illustrated in FIG. 1.

As part of the alignment process, the vehicle 203 may be driven into a car alignment bay and placed on an alignment lift. Each of the wheels 205, 207, 209, and 211 may have one of the alignment sensors 107 attached to it. The engine may be started and the steering wheel 101 may be rocked back and forth and then locked in its level position. The camber and toe of the rear wheels 209 and 211 may be aligned, if the vehicle permits such alignments, and the rear thrust angle may be measured. The processing system 113 and/or a different processing system may be used in connection with one or more of these steps.

The caster, camber and toe of the front wheels 205 and 207 may be aligned next, again using the processing system 113 and/or another processing system. All of the alignments that have thus-far been described may be performed using standard alignment techniques and equipment, and/or any other techniques or equipment.

After the alignment, the lock on the steering wheel 101 may be removed and the steering wheel centering function of the vehicle wheel alignment system may be activated, such as by pressing a real or virtual button that is part of the user interface 109.

Upon actuation, the pointer 217 may indicate that the front wheels are pointing straight forward, i.e., that their toe angles are approximately equal. The marker 221 may be positioned at a pre-determined location on the scale 219 corresponding to where the vehicle alignment system would like for the technician to turn the front wheels 205 and 207 by turning the steering wheel 101. An instruction such as "TURN STEERING WHEEL COUNTER-CLOCKWISE UNTIL METER POINTS TO MARKER" may be displayed by the display 111 in the message section 215. In another embodiment, the mere appearance of the marker 221 or of any other type of comparable indicia, or the issuance of a sound, such as a beep, beeps or voice instruction, may be utilized as the sole form of such an instruction to the user. In a still further embodiment, a combination of two or more of these as well as other methods may be used.

The pre-determined amount which the steering wheel 101 is requested to be turned may vary. In some embodiments, the amount may be selected to be great enough to overcome anticipated hysteresis in the steering. This predetermined amount may always be the same or it may vary depending upon the particular vehicle that is being aligned. This predetermined amount may be manually specified by a user or preprogrammed into the processing system 113. The processing system 113 may be configured to store a variety of predetermined amounts and to select one that is appropriate for the particular vehicle that is being aligned based on information provided to the processing system 113 through the user interface 109 by the user about the vehicle.

Typically, the preprogrammed amount will be greater than one degree. For some applications, it may be approximately five degrees. In some applications, the processing system 113 may be configured to signal the technician that the technician may stop rotating the steering wheel 111 when the relative movement between the steering wheel 111 and the vehicle wheels 103 indicates that all of the slack caused by the hysteresis has been removed.

After receiving the instruction to turn the steering wheel 101, whether through text in the message section 215, the marker 221, and/or through other means, the technician may rotate the steering wheel 101 in accordance with the instructions. In this example, the technician may rotate the steering wheel 101 counter-clockwise.

The processing system 113 may be configured to cause the pointer 217 to move toward the marker 221 as the front wheels turn. The pointer 217 may reach the marker 221 approximately when the individual toe angle of one or both of the front wheels 205 and 207 reaches the predetermined amount, e.g., five degrees. It may do this based on alignment information that it receives from the alignment sensors 107.

The technician may watch the pointer 217 as the steering wheel 101 is rotated. The technician may stop rotating the steering wheel 101 when the pointer 217 reaches the marker 221 or the technician may rotate the steering wheel past this point.

The processing system 113 may be configured to recognize when the toe angle has reached the predetermined amount by virtue of the alignment information that it receives from the alignment sensors 107. At this point, the processing system 113 may or may not cause a beep or other indication to be communicated to the technician. It may then change the location of the marker 221 to a second pre-determined toe angle position at the other side of the scale 219. It may also change the message that is displayed to the technician in the message section 215 to direct the technician to turn the wheel clockwise until the pointer again points to the marker using any of the formats discussed above, such as by displaying the message "TURN STEERING WHEEL CLOCKWISE UNTIL METER POINTS TO MARKER," as illustrated in FIG. 2(b).

Figure 2B:
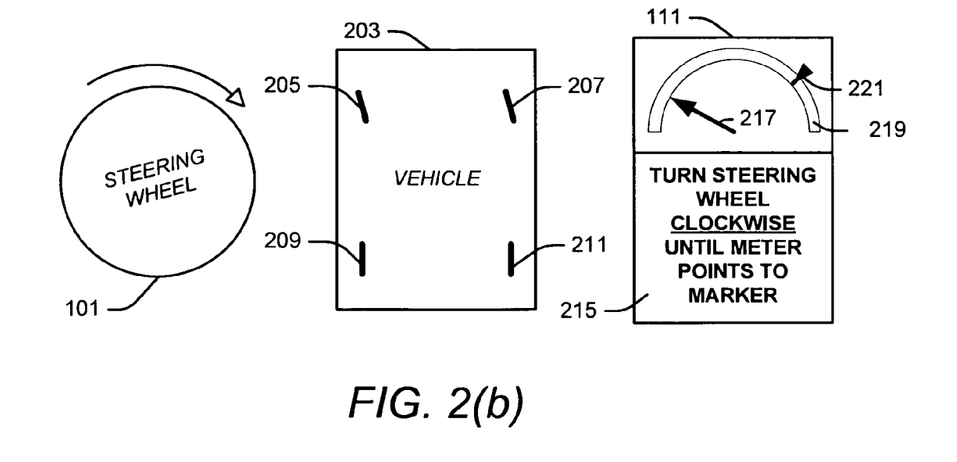

The new location for the marker 221 that is shown in FIG. 2(b) may be a toe angle that is approximately opposite of the toe angle that was specified by the marker 221 that is shown in FIG. 2(a), e.g., five degrees in the other direction. Again, the toe angle that is signified by the marker 221 that is shown in FIG. 2(b) may be a predetermined amount and be based on any one or all of the same considerations that are discussed above in connection with the position of the marker 221 shown in FIG. 2(a). It may be equal in magnitude to the toe angle that is illustrated by the marker 221 shown in FIG. 2(a) or it may be unequal. Except for the difference in the desired toe angle, the step illustrated in FIG. 2(b) may be governed by the same considerations and variations as the step discussed above in connection with FIG. 2(a).

Figure 2C:
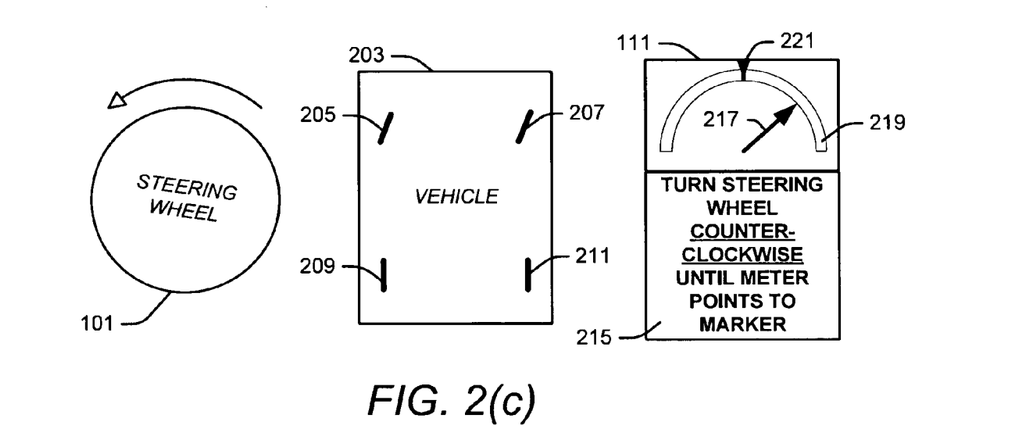

The technician may then turn the steering wheel 101 clockwise until the pointer 217 reaches or surpasses the marker 221. When the pointer 217 reaches the second position of the marker 221 shown in FIG. 2(b), the processing system 113 may or may not cause a beep or other indication to be communicated to the technician. At this time, the processing system 113 may move the marker 221 to a third pre-determine toe angle location on the scale 219, this time at a position at which the toe angles of the front wheels 205 and 207 would be substantially equal, as illustrated in FIG. 2(c). The processing system 113 may direct the technician to turn the wheel counter-clockwise until the pointer again points to the marker using any of the formats discussed above, such as by displaying the message "TURN STEERING WHEEL COUNTER-CLOCKWISE UNTIL METER POINTS TO MARKER," as also illustrated in FIG. 2(a).

Figure 2D:
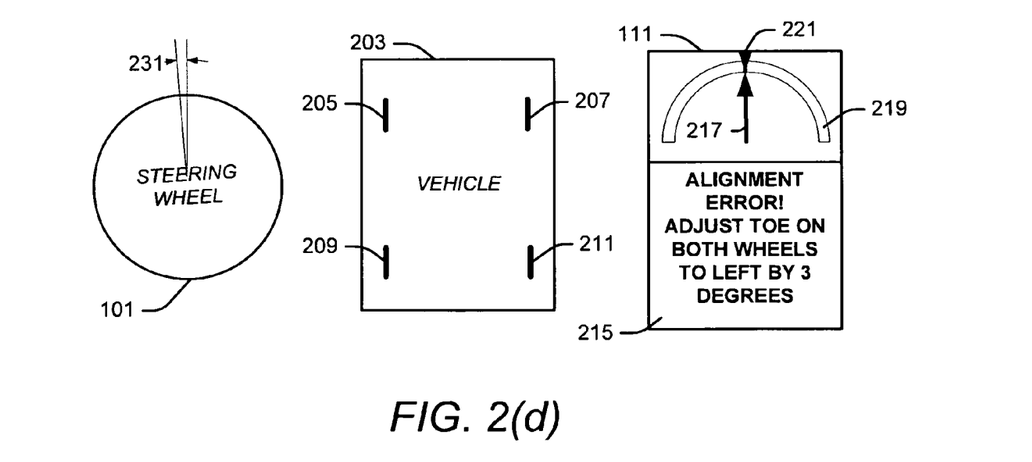

The technician may then rotate the steering wheel 101 counter-clockwise until the pointer 217 arrives at the position of the marker 221 that is shown in FIG. 2(c), thus causing the toe angles of the front wheels 205 and 207 to be substantially equal, as illustrated in FIG. 2(d). As the pointer 217 nears the marker 221 for the substantially equal toe angles, the technician may slow the rotation of the steering wheel 101 so as not to overshoot the marker 221.

At this point, the processing system 113 may or may not cause a beep or other indication to be communicated to the technician. It may then analyze the information from the rotational position sensor 105 for the purpose of determining whether the steering wheel 101 is level, as it should be at this point. If it is not, as illustrated by the centering error 231 in FIG. 2(d), the processing system 113 may alert the technician to the centering error. For example, it may provide the message "ALIGNMENT ERROR!" in the message section 215 of the display 111, as illustrated in FIG. 2(d).

The processing system may determine the shift in the toe angles that are needed to correct for this centering error and communicate this information to the technician. It may do so, for example, by taking into consideration the gear ratio between the steering wheel and the vehicle wheels. A table mapping offsets between the steering wheel 101 and the substantially equal toe angles of the vehicle wheels 205 and 207 may in addition or instead be consulted by the processing system 113.

For example, the processing system 113 may provide the message "ADJUST TOE ON BOTH WHEELS TO LEFT BY 3 DEGREES," as shown in FIG. 2(d). Of course, "3 DEGREES" is only an example. The amount that actually appears may be different, as well as the way in which this amount is communicated. In another embodiment, the needed correction may not be the same for each wheel, in which event the amount for each wheel may be specified. In another embodiment, the processing system 113 may merely signal that there is an alignment error, without specifying the amount.

The technician may then adjust one or more of the toe angles in accordance with the recommendation of the alignment system. The technician may repeat the entire verification test that has been described above in connection with FIGS. 2(a)-(d) to verify that the steering wheel 101 is substantially level when the toe angles of the front wheels are substantially equal. If necessary, the technician may repeat the process as many times as is necessary to obtain the desired alignment.

The net effect of the systems and processes that have been described may be to verify the level of the steering wheel 101 and to correct any errors that are detected, all without having to detach the alignment sensors, remove the vehicle from the lift, test drive the vehicle, return the vehicle to the lift, and re-attach the alignment sensors. Of course, a road test of the vehicle may still be performed.

FIGS. 3(a)-(e) illustrate another process for testing the centering of a steering wheel using the wheel alignment system illustrated in FIG. 1. This process may be used in connection with a system other than the one illustrated in FIG. 1, and the system illustrated in FIG. 1 may be used in connection with a process other than the one illustrated in FIGS. 3(a)-(e). Except for the differences noted below, the process may use the same procedures illustrated in FIGS. 2(a)-(d) and 3(a)-(d), and may be governed by the same criteria, variations, considerations, and results.

Figure 3A:
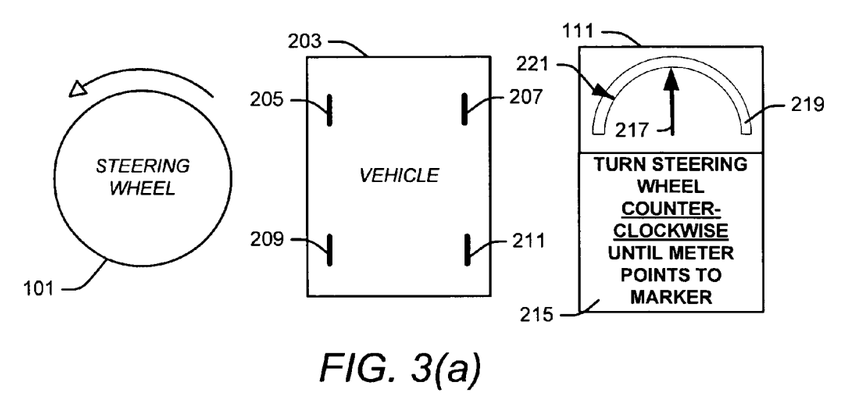
FIGS. 3(a)-(e) illustrate another process for testing the centering of a steering wheel using the wheel alignment system illustrated in FIG. 1.

The first step of the process that is illustrated in FIG. 3(a), for example, may be identical to the first step that is illustrated in FIG. 2(a). The marker 221 may be located on the scale 219 at a position seeking to cause the wheels to be turned to the left, and the technician may similarly be directed to "TURN STEERING WHEEL COUNTER-CLOCKWISE UNTIL METER POINTS TO MARKER." Similarly, the operator may rotate the steering wheel 101 counter-clockwise until the pointer 217 points to or surpasses the marker 221.

Figure 3B:
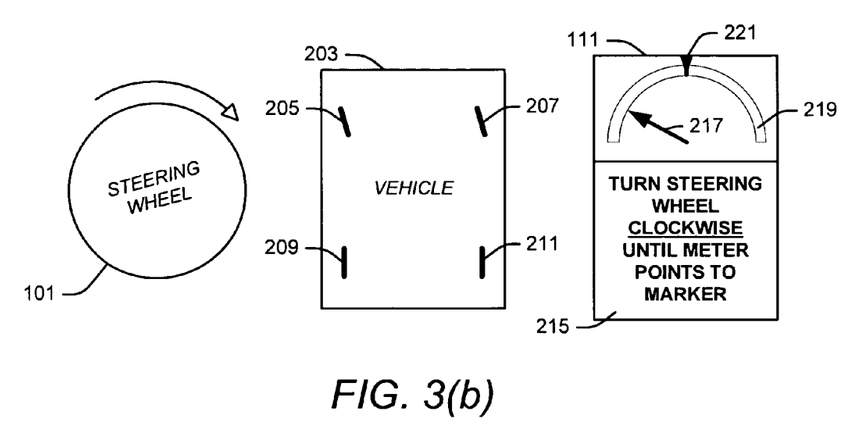

The second step of the process, as illustrated in FIG. 3(b), may be similar to the second step illustrated in FIG. 2(b), except that the marker 221 may now be positioned to where the toe angles are approximately equal, rather than at a position at which the wheels would be turned to the right. The technician may then rotate the steering wheel 101 clockwise, as instructed, slowing until the pointer 217 points to the marker 221 in the position shown in FIG. 3(b). When the toe angles are substantially equal, as reflected in FIG. 3(c), the processing system 113 may or may not communicate to the technician an indication that this position has been reached. It may then determine the rotational position of the steering wheel 101 based on the information from the rotational position sensor 105. If it is not level, such as if it is offset by an offset error 301 shown in FIG. 3(c), it may record this offset for future reference. Unlike the embodiment illustrated in FIGS. 2(a)-(d), the processing system may not yet announce that there is a leveling error, but instead wait to examine the nature and degree of any corresponding leveling error when the front wheels are returned to a substantially zero toe angle position from the opposite direction. Of course, the processing system 113 may announce the error as well.

Figure 3C:
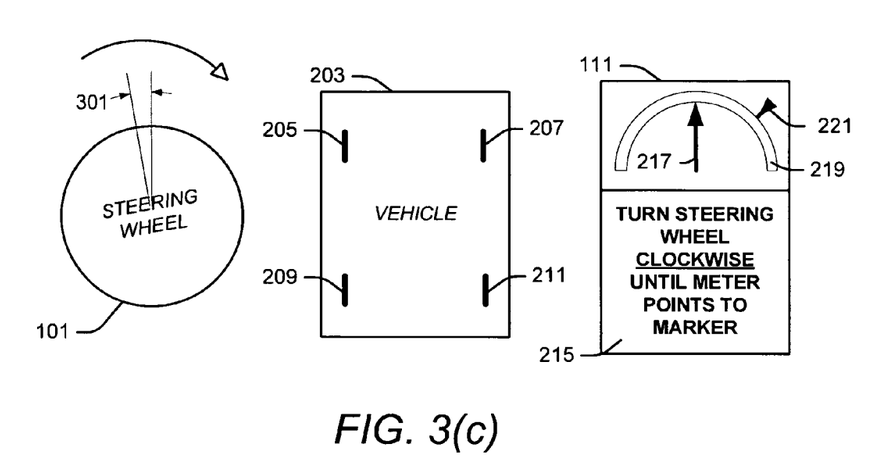
Figure 3D:
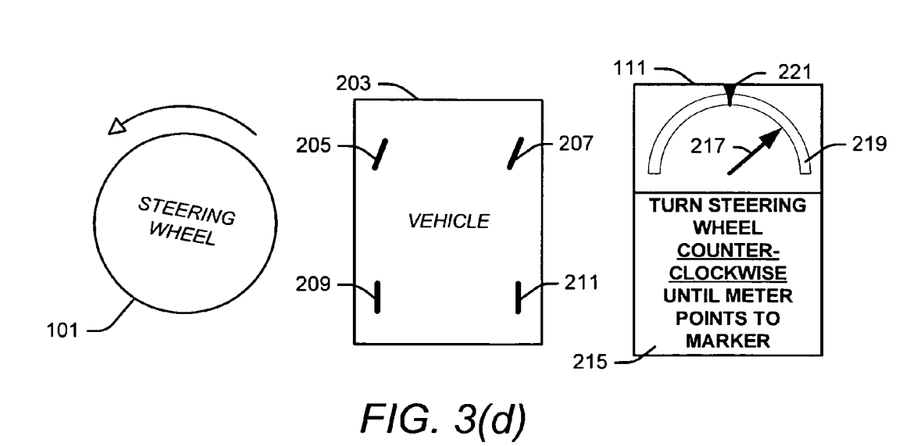

The processing system may now cause the marker 221 to appear at the right side of the scale 219 and to correspondingly direct the technician to "TURN STEERING WHEEL CLOCKWISE UNTIL METER POINTS TO MARKER," as illustrated in FIG. 3(c). The technician may comply with this instruction by rotating the steering wheel clockwise until the position illustrated in FIG. 3(d) is reached or surpassed. At this point, the processing system 113 may or may not communicate to the technician an indication that this position has been reached.

The processing system may then move the marker 221 to the center of the scale 219 to where the toe angles of the front wheels will be substantially equal and direct the technician to "TURN STEERING WHEEL COUNTER-CLOCKWISE UNTIL METER POINTS TO MARKER," as also illustrated in FIG. 3(d).

Figure 3E:
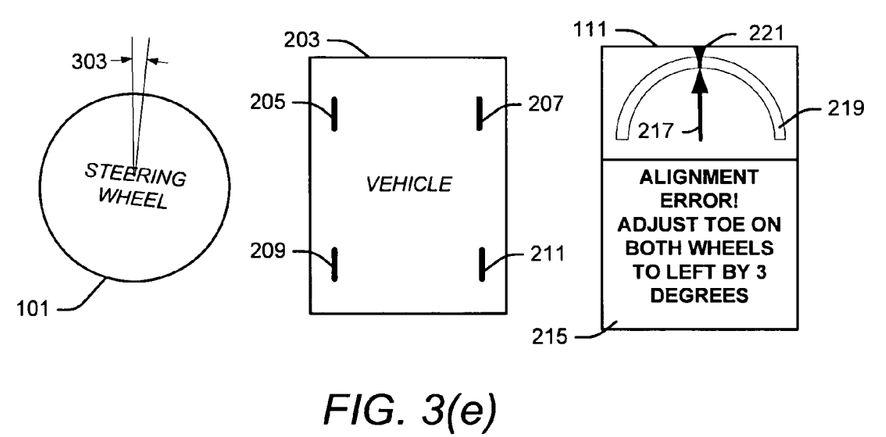

The operator may again comply by rotating the steering wheel counter-clockwise until the pointer 217 reaches the marker 221, thus indicating that the toe angles are substantially equal, as illustrated by the position of the pointer 217 in FIG. 3(e). The technician may slow the rotation as the pointer 217 approaches the marker 221 so as to not overshoot the marker 221. At this point, the processing system may or may not communicate to the technician an indication that this position has been reached.

The processing system may again at this time determine the rotational position of the steering wheel 101 by examining the information from the rotational position sensor 105. It may also compare any offset error 303 that is determined with the offset error 301 that was determined in connection with the step illustrated in FIG. 3(c). If the error is substantially equal but opposite, this may indicate that the steering wheel 101 has been leveled as best as may be practical in view of the hysteresis of the system. On the other hand, if the offset errors 301 and 303 are not substantially equal but opposite, the processing system may indicate an alignment error and/or the degree of shift in the toe angles that may be necessary to correct for it. For example, it may communicate "ALIGNMENT ERROR! ADJUST TOE ON BOTH WHEELS TO LEFT BY 3 DEGREES" as illustrated in FIG. 3(e). In another embodiment, the needed correction may not be the same for each wheel, in which event the amount for each wheel may be specified. The technician may then proceed to correct the error in the toe angles, as recommended, and rerun the test procedure illustrated in FIGS. 3(a)-(e) to verify that the level position of the steering wheel 101 satisfactorily coincides with when the toe angles of the front wheels are substantially equal. If the errors 301 and/or 303 are greater than a predetermined amount, the processing system may indicate that there may be a mechanical problem with the steering system that may need to be corrected before the wheels can be properly aligned.

FIGS. 4(a)-(e) illustrate another process for testing the centering of a steering wheel using the wheel alignment system illustrated in FIG. 1. This process may be used in connection with a system other than the one illustrated in FIG. 1, and the system illustrated in FIG. 1 may be used in connection with a process other than the one illustrated in FIGS. 4(a)-(e). Except for the differences noted below, the process may use the same procedures illustrated in FIGS. 2(a)-(d) and 3(a)-(d), and may be governed by the same criteria, variations, considerations, and results.

Figure 4A:
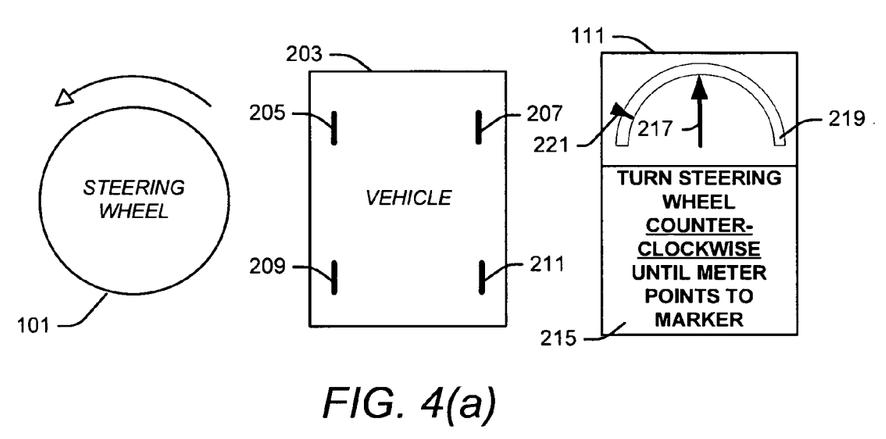
FIGS. 4(a)-(e) illustrate another process for testing the centering of a steering wheel using the wheel alignment system illustrated in FIG. 1.

The first step of the process, as illustrated in FIG. 4(a), may be the same as the first step illustrated in FIGS. 2(a) and 3(a) and discussed above. In brief, the technician may be directed to turn the wheel counter-clockwise until one or both toe angles are at a first predetermined amount.

Figure 4B:
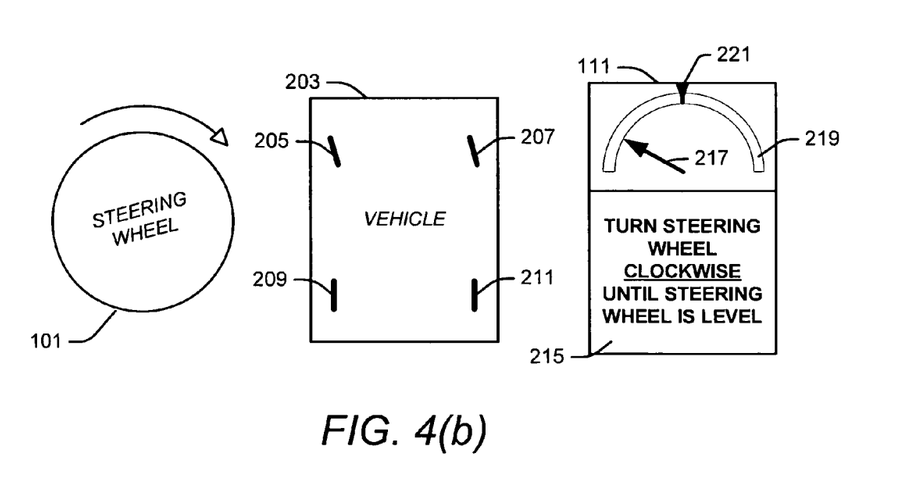

The second step, as illustrated in FIG. 4(b), may be different from any of the second steps that have been discussed above. Instead of directing the technician to rotate the steering wheel 101 clockwise until a particular toe angle is reached, the processing system 113 may direct the operator to rotate the steering wheel 101 clockwise until it is level. For example, the processing system may cause the message "TURN STEERING WHEEL CLOCKWISE UNTIL STEERING WHEEL IS LEVEL" to be communicated to the technician, as illustrated in FIG. 4(b).

Figure 4C:
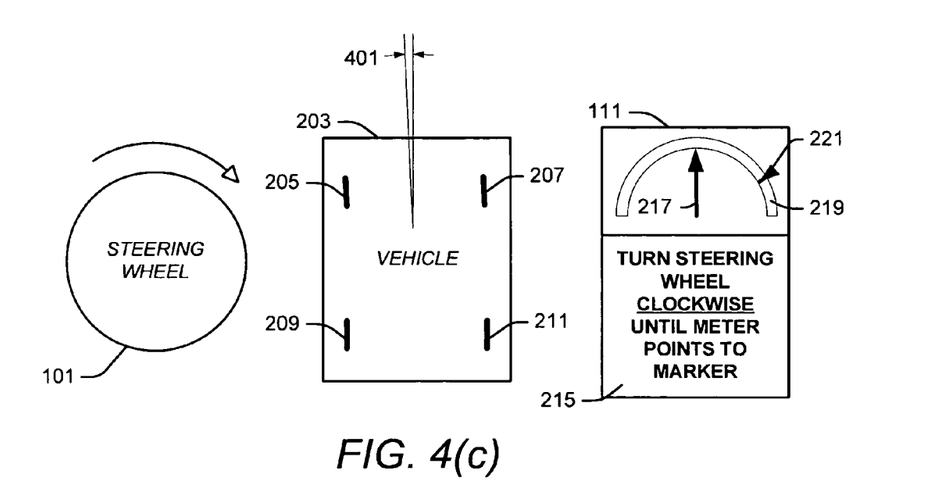

In this embodiment, the processing system 113 may cause the marker 221 to be located on the scale 219 at a position at which the processing system anticipates the steering wheel 101 will be level, based on information from the rotational position sensor 105. The technician may then rotate the steering wheel 101 clockwise until the pointer 217 points to the marker 221, i.e., until the steering wheel is level. The technician may slow the rotation before reaching the marker 221 so as to not overshoot it. At this point, the processing system 113 may recognize that the steering wheel 101 is level by virtue of the information from the rotational position sensor 105 and may or may not communicate to the technician an indication that this position has been reached. The processing system 113 may then determine the toe angles by examining the information from the alignment sensors 107. Ideally, the toe angles should be substantially equal. If there is instead an offset error 401, as illustrated in FIG. 4(c), the processing system 113 may record the offset error 401 for later use. It may or may not communicate the offset error 401 to the technician at this time.

After recording the offset error 401, the processing system 113 may move the marker 221 to the right of the scale 219 and may correspondingly instruct the technician to "TURN STEERING WHEEL CLOCKWISE UNTIL METER POINTS TO MARKER," as illustrated in FIG. 4(c). The operator may comply by rotating the steering wheel 101 clockwise until the pointer 217 reaches or surpasses the marker 221, as reflected in FIG. 4(d). At this point, the processing system 113 may or may not communicate to the technician an indication that this position has been reached.

Figure 4D:
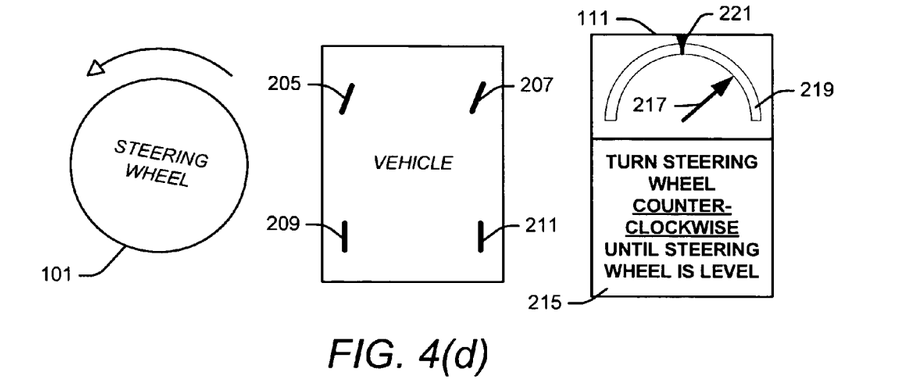

The processing system may then move the marker 221 to the center of the scale 219 and direct the technician to "TURN STEERING WHEEL COUNTER-CLOCKWISE UNTIL STEERING WHEEL IS LEVEL," as illustrated in FIG. 4(d). Again, the marker 221 in this instance may be set to the point at which the steering wheel 101 will be level which may not necessarily be the point at which the toe angles are substantially equal.

Figure 4E:
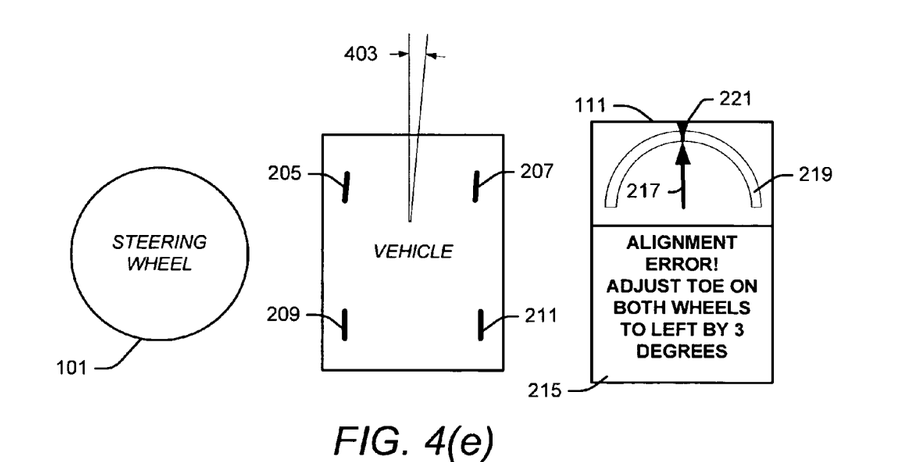

The operator may comply by rotating the steering wheel 101 counter-clockwise until it is level, as indicated by the pointer 217 pointing to the marker 221, as illustrated in FIG. 4(e). Again, the operator may slow the rotation when approaching the level position to avoid overshoot. At this point, the processing system 113 may or may not communicate to the technician an indication that this level position has been reached.

The processing system at this time may again measure the front toe angles based on information from the alignment sensors 107. If there is an offset error 403, as shown in FIG. 4(e), the processing system 113 may compare it with the offset error when driven from the opposite direction, e.g., compare the offset error 401 with the offset error 403. If they are substantially equal but opposite, the processing system 113 may interpret this as indicating that the toe angle is properly aligned, as explained above in connection with FIG. 3(e). Otherwise, the processing system 113 may cause an alignment error message to be displayed, such as the "ALIGNMENT ERROR! ADJUST TOE ON BOTH WHEELS TO LEFT BY 3 DEGREES" message illustrated in FIG. 2(d). In another embodiment, the needed correction may not be the same for each wheel, in which event the amount for each wheel may be specified. Again, the message may instead not specify the amount of correction to the toe angle that is needed.

Figure 5:
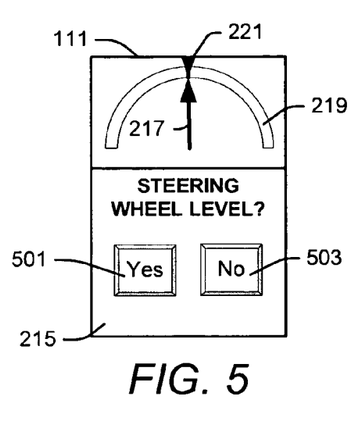
FIG. 5 illustrates another embodiment of a display message that may appear in connection with the processes illustrated in FIGS. 2 and/or 3.

FIG. 5 illustrates another embodiment of a display message that may appear in connection with the processes illustrated in FIGS. 2 and/or 3. This embodiment may be used in connection with alignment systems that lack a rotational position sensor, such as the rotational position sensor 105. After the step illustrated in FIG. 2(c), for example, the technician may rotate the steering wheel 101 counter-clockwise until the front individual toe angles are substantially equal, as reflected in FIG. 5 by the pointer 217 pointing to the marker 221.

At this point, the processing system 113 may query the technician about the rotational position of the steering wheel 101. For example, the processing system 113 may cause the question "STEERING WHEEL LEVEL?" to appear in the message section 215 of the display 211, along with a "Yes" touch button 501 and a "No" touch button 503, as illustrated in FIG. 5. The technician may then examine the steering wheel 101 and touch the "Yes" touch button 501 if the steering wheel appears to be level or the "No" touch button 503 if it does not.

If the technician touches the "Yes" touch button 501, the processing system 113 may let the technician know that the toe angle is properly aligned. For example, it may cause a message "TOE ANGLE IS PROPERLY ALIGNED" to appear in the message section 215. On the other hand, if the operator touches the "No" touch button 503, the processing system 113 may let the technician know that the toe angle is not properly aligned. For example, it may cause a message "STEERING WHEEL ALIGNMENT ERROR! TOE ANGLE MUST BE ADJUSTED" to appear.

In some embodiments, the processing system 113 may invite the technician to enter an approximate measurement of the steering wheel offset error, such as a measurement of the offset error 221 shown in FIG. 2(d). The processing system 113 may then compute a needed shift in the toe angles and communicate this to the technician, such as with an appropriate message in the message section 215 of the display 111.

One or more of these same or similar procedures may be used in connection with the steering wheel level assessments that are made at the steps of the process illustrated in FIGS. 3(c) and 3(e).

Figure 6:
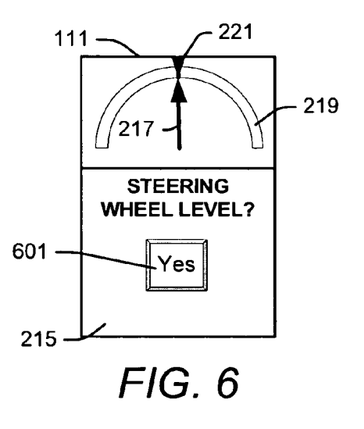
FIG. 6 illustrates another embodiment of a display message that may appear in connection with the process illustrated in FIG. 4.

FIG. 6 illustrates another embodiment of a display message that may appear in connection with the process illustrated in FIG. 4. This again may be used in connection with an alignment system in which there is no rotational position sensor and thus in which the processing system 113 is unable to determine the rotational position of the steering wheel 101 on its own. After directing the technician to rotate the steering wheel until it is level, as illustrated in FIGS. 4(b) and (d), the processing system 113 may query the technician to tell it when the rotational position of the steering wheel 101 is level. For example, it may cause a message such as "STEERING WHEEL LEVEL?" and an associated "Yes" touch button 601 to appear in the message section 215 of the display 111, as illustrated in FIG. 6. Once the technician rotates the steering wheel to a position that appears to be level, the technician may touch the "Yes" touch button 601, thus signaling to the processing system 113 that the steering wheel is level and allowing it to proceed with the corresponding analysis of the toe positions, as illustrated in FIGS. 4(c) and 4(e) and discussed above in connection with these figures.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

For example, the technician may be directed to first turn the steering wheel clockwise, rather than counter-clockwise, as illustrated in FIGS. 2(a), 3(a), and 4(b). The technician may similarly be directed in subsequent steps to rotate the steering wheel in directions opposite to those stated. Such an approach may be useful in connection with vehicles that are driven on the left hand side of the road.

In lieu of directing a technician to manually rotate the steering wheel, the vehicle wheel alignment system may include and/or control a motor or other device that automatically rotates the steering wheel when needed, thus fully automating the process.

Some of the alignment steps that have thus-far been described focus on substantially equal toe angles and/or substantially level positions of the steering wheel. In other embodiments, one or more of these same steps may be directed to synchronizing the position of the steering wheel to positions of the steerable wheels that are other than straight ahead.

Although the engine has thus-far been described as being run at the beginning of the alignment process, the engine may not be so run in another embodiment, such as an embodiment in which there is no power steering.

Similarly, although certain alignment steps have been described as preceding the processes illustrated in FIGS. 2-4, additional alignment steps or fewer alignment steps may instead take place.

The embodiments that have been described may include or be utilized with any appropriate voltage or current source, such as a battery, alternator, fuel cell or the like. These may provide any appropriate voltage or current, such as about 12 or 42 volts or the like.

The embodiments that have been described may be used with any type of system or engine. These systems or engines may use fossil fuels, such as gasoline, natural gas, propane or the like, electricity, such as that generated by battery, magneto, fuel cell and the like, wind and hybrids or combinations thereof. These systems and engines may be incorporated into other systems, such as an automobile, a truck, a boat or ship, motorcycle, a generator, and airplane and the like.

In short, the scope of protection is limited solely by the claims that now follow. That scope is intended to be as broad as is reasonably consistent with the language that is used in the claims and to encompass all structural and functional equivalents.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

What is claimed is:

1. A vehicle wheel alignment system comprising:
   wheel alignment sensors configured to measure toe angles of steerable wheels on the vehicle;
   a user interface configured to communicate information to a user; and
   a processing system configured to cause the user interface to communicate instructions to rotate a steering wheel on the vehicle to a position other than level and to communicate centering information that is pertinent to whether the steering wheel is substantially centered with respect to the steerable wheels based at least in part on the toe angles, wherein the processing system is also configured to determine whether the steering wheel is substantially centered with respect to the steerable wheels and to cause the user interface to communicate the results of this determination.

2. The vehicle wheel alignment system of claim 1 wherein the centering information includes information indicative of when one or more toe angles have reached a predetermined amount.

3. The vehicle wheel alignment system of claim 1 wherein the centering information includes information indicative of when the toe angles are approximately equal.

4. The vehicle wheel alignment system of claim 1 wherein the centering information includes information indicative of when the steering wheel is approximately level.

5. The vehicle wheel alignment system of claim 4 wherein the processing system is configured to receive steering information other than toe angle information that is indicative of the rotational position of the steering wheel.

6. The vehicle wheel alignment system of claim 5 further comprising a rotational position sensor that is different from the wheel alignment sensors and that is configured to measure the rotational position of the steering wheel.

7. The vehicle wheel alignment system of claim 5 wherein the user interface is configured to receive information from the user about the rotational position of the steering wheel.

8. The vehicle wheel alignment system of claim 1 wherein the processing system is configured to cause the user interface to communicate instructions to the user to rotate the steering wheel in a first direction and then in a second direction opposite the first direction.

9. The vehicle wheel alignment system of claim 8 wherein the processing system is configured to cause the user interface to communicate instructions to the user to rotate the steering wheel in the second direction until the toe angles are substantially equal.

10. The vehicle wheel alignment system of claim 8 wherein the processing system is configured to cause the user interface to communicate instructions to the user to rotate the steering wheel in the second direction until the steering wheel is substantially level.

11. The vehicle wheel alignment system of claim 8 wherein the processing system is configured to cause the user interface to communicate instructions to the user to rotate the steering wheel in a third direction opposite the second direction.

12. The vehicle wheel alignment system of claim 11 wherein the processing system is configured to cause the user interface to communicate instructions to the user to rotate the steering wheel in the third direction until the steering wheel is substantially level.

13. The vehicle wheel alignment system of claim 11 wherein the processing system is configured to cause the user interface to communicate instructions to the user to rotate the steering wheel in the third direction until the toe angles are substantially equal.

14. The vehicle wheel alignment system of claim 1 wherein the processing system is configured to cause the user interface to communicate instructions to the user to rotate the steering wheel until the steering wheel is substantially level.

15. The vehicle wheel alignment system of claim 1 wherein the processing system is configured to cause the user interface to communicate instructions to the user to rotate the steering wheel until the toe angles are substantially equal.

16. The vehicle wheel alignment system of claim 1 wherein the processing system is configured to determine the amount by which the toe angles need to be adjusted to cause the steering wheel to be substantially centered with respect to the steerable wheels and to cause the user interface to communicate this amount.

17. The vehicle wheel alignment system of claim 1 wherein the processing system is configured to compare toe angles of the same wheel at different times and to determine whether the centering of the steering wheel is acceptable based on the comparison.

18. A vehicle wheel alignment system comprising:
   wheel alignment sensors configured to measure toe angles of steerable wheels on the vehicle;
   a user interface configured to communicate information to a user;
   a processing system configured to determine whether a steering wheel on the vehicle is substantially centered with respect to the steerable wheels based at least in part on determining whether the toe angles are substantially equal; and
   a rotational position sensor that is different from the wheel alignment sensors and that is configured to measure the rotational position of the steering wheel.

19. A process for verifying the alignment of steerable wheels in a vehicle having a steering wheel and linkages between the steerable wheels and the steering wheel that has hysteresis comprising:
   rotating the steering wheel in a first direction while the vehicle is at rest at least until the rotation causes the steerable wheels to turn;
   rotating the steering wheel in a second direction opposite the first direction while the vehicle is at rest until the toe angles of the steerable wheels are substantially equal; and
   determining whether there is a misalignment between the steering wheel and the steerable wheels based on whether the steering wheel is substantially centered.

20. The process of claim 19 further comprising communicating information about an adjustment that would substantially compensate for a misalignment between the steering wheel and the steerable wheels.

21. A process for verifying the alignment of steerable wheels in a vehicle having a steering wheel and linkages between the steerable wheels and the steering wheel that has hysteresis comprising:
   rotating the steering wheel in a first direction while the vehicle is at rest at least until the rotation causes the steerable wheels to turn;
   rotating the steering wheel in a second direction opposite the first direction while the vehicle is at rest until the steering wheel is substantially centered; and
   determining whether there is a misalignment between the steering wheel and the steerable wheels based on whether the toe angles of the steerable wheels are substantially equal.

22. The process of claim 21 further comprising communicating information about an adjustment that would substantially compensate for a misalignment between the steering wheel and the steerable wheels.

\* \* \* \* \*